United States Patent [19]
Forssén et al.

[11] Patent Number: 5,649,287
[45] Date of Patent: Jul. 15, 1997

[54] ORTHOGONALIZING METHODS FOR ANTENNA PATTERN NULLFILLING

[75] Inventors: Ulf Göran Forssén, Satlsjö-Boo; Stig Roland Bodin, Spånga, both of Sweden

[73] Assignee: Telefonaktiebolaget LM Ericsson, Stockholm, Sweden

[21] Appl. No.: 412,921

[22] Filed: Mar. 29, 1995

[51] Int. Cl.⁶ .................... H04B 7/26; H04Q 7/30
[52] U.S. Cl. .................. 370/312; 455/59; 455/101; 455/273; 455/504; 342/367; 370/328; 370/339
[58] Field of Search .................. 455/33.1, 25, 33.3, 455/53.1, 54.1, 52.1, 59, 60, 101, 103, 105, 272, 273; 342/359, 361, 367; 379/59, 60

[56] References Cited

U.S. PATENT DOCUMENTS

| | | | |
|---|---|---|---|
| 4,661,993 | 4/1987 | Leland et al. | 455/103 |
| 5,117,503 | 5/1992 | Olson | 455/51.1 |
| 5,329,548 | 7/1994 | Borg | 455/103 |

FOREIGN PATENT DOCUMENTS

| | | |
|---|---|---|
| 419429A1 | 3/1991 | European Pat. Off. . |
| 2237706 | 5/1991 | United Kingdom . |
| WO93/01663 | 1/1993 | WIPO . |

OTHER PUBLICATIONS

D. Borgmann, "Steuerung und Formung von Strahlungscharakteristiken mit Gruppenantennen", Wissenschaftliche Berichte AEG Telefunken, vol. 54, No. 1/2, pp. 25–43 (1981).

S. C. Swales et al., "A Spectrum Efficient Cellular Base-Station Antenna Architecture", Personal and Mobile Radio Communications Conference 1991, Warwick, pp. 272–279 (1991).

Y. Yamada et al., "Base Station/Vehicular Antenna Design Techniques Employed in High–Capacity Land Mobile Communications System", Review of the Electrical Communications Laboratories, vol. 35, No. 2, pp. 115–121 (Mar. 1987).

S. Anderson et al., "An Adaptive Array for Mobile Communication Systems," IEEE Trans. on Veh. Tech., vol. 40, No. 1, pp. 230–236 (Feb. 1991).

S. Choi et al., "Adaptive Antenna Array Utilizing the Conjugate Gradient Method for Multipath Mobile Communication," Signal Processing, vol. 29, pp. 319–333 (1992).

S.P. Stapleton et al., "A Cellular Base Station Phased Array Antenna System," Proceedings of IEEE Veh. Tech. Conf., pp. 93–96 (1993).

J.J. Winters, "Optimum Combining in Digital Mobile Radio with Cochannel Interference," IEEE Trans. on Veh. Tech., vol. VT–33, No. 3, pp. 144–155 (Aug. 1984).

Appendix to Request of Spatial Communications, Inc., for a Pioneer's Preference in the Licensing Process for Personal Communications Services: Implementing SDMA in the PCS Environment, Technical and Economic Factors, (May 4, 1992).

*Primary Examiner*—Chi H. Pham
*Attorney, Agent, or Firm*—Burns, Doane, Swecker & Mathis, L.L.P.

[57] ABSTRACT

A method for broadcasting information in a cellular communication system comprising at least one base station with an antenna array and a plurality of mobile stations is disclosed. The common information is preprocessed to create orthogonal signals. The orthogonal signals are then beam formed so that the orthogonal signals are delivered to the different elements in the array antenna. The orthogonal signals are transmitted and then received at at least one mobile station. The signals are then processed at the mobile station to decipher the common information from the orthogonal signals.

13 Claims, 6 Drawing Sheets

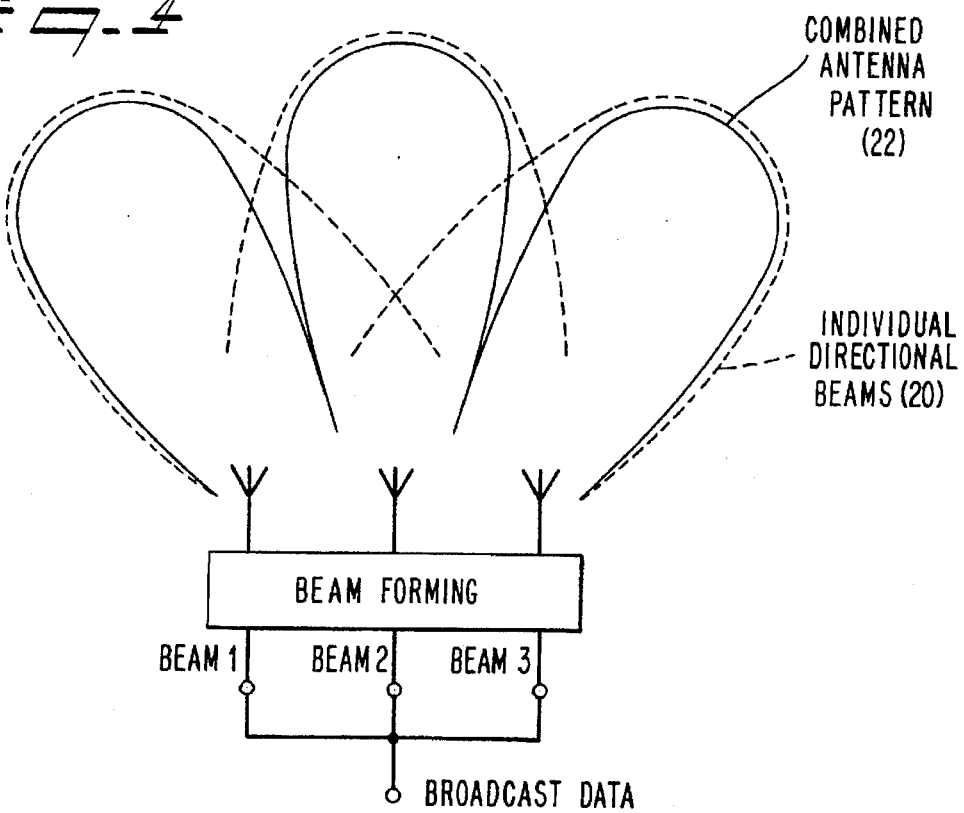
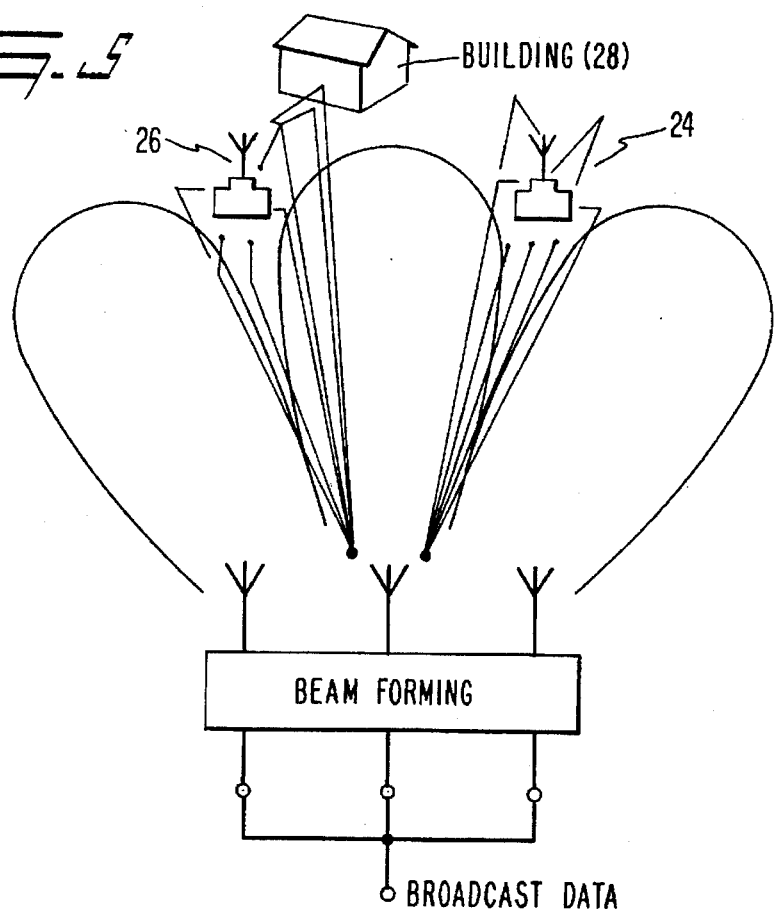

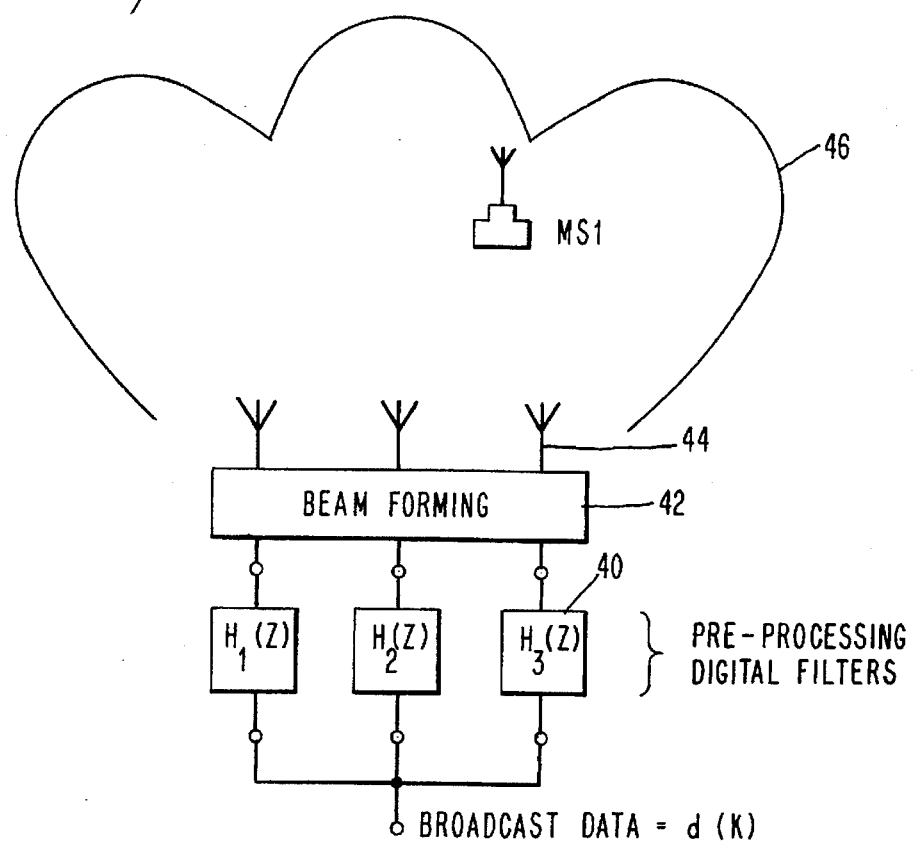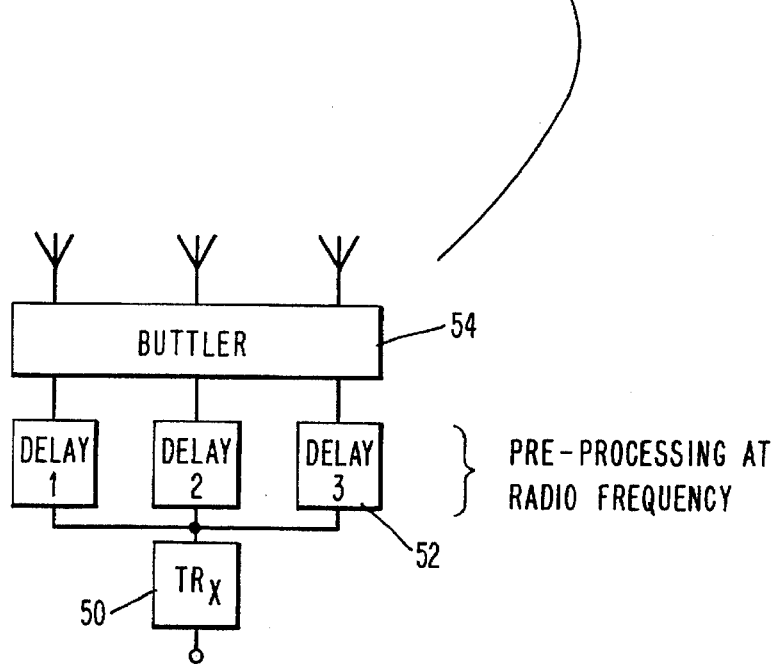

ORTHOGONALIZING METHODS FOR ANTENNA PATTERN NULLFILLING

FIELD OF THE INVENTION

The present invention relates to transmitting information in a cellular communication system, and more particularly to the creation of wide antenna lobes from directional antennas for broadcasting common information over a broad coverage area.

BACKGROUND OF THE INVENTION

FIG. 1 illustrates ten cells C1–C10 in a typical cellular mobile radio communication system. Normally a cellular mobile radio system would be implemented with more than ten cells. However, for the purposes of simplicity, the present invention can be explained using the simplified representation illustrated in FIG. 1. For each cell, C1–C10, there is a base station B1–B10 with the same reference number as the corresponding cell. FIG. 1 illustrates the base stations as situated in the vicinity of the cell center and having omni-directional antennas. FIG. 1 also illustrates nine mobile stations M1–M9 which are movable within a cell and from one cell to another. In a typical cellular radio communication system, there would normally be more than nine cellular mobile stations. In fact, there are typically many times the number of mobile stations as there are base stations. However, for the purposes of explaining the present invention, the reduced number of mobile stations is sufficient.

Also illustrated in FIG. 1 is a mobile switching center MSC. The mobile switching center MSC illustrated in FIG. 1 is connected to all ten base stations B1–B10 by cables. The mobile switching center MSC is also connected by cables to a fixed switch telephone network or similar fixed network. All cables from the mobile switching center MSC to the base stations B1–B10 and the cables to the fixed network are not illustrated.

In addition to the mobile switching center MSC illustrated, there may be additional mobile switching centers connected by cables to base stations other than those illustrated in FIG. 1. Instead of cables, other means, for example, fixed radio links, may also be used to connect base stations to mobile switching centers. The mobile switching center MSC, the base stations, and the mobile stations are all computer controlled.

Current digital cellular systems employ base stations which separate mobile stations using time and frequency orthogonality. Signals from a mobile propagate to a base station wherein the signals are received in a single or sometimes a plurality of antenna elements to gain diversity effects. The receiver signal processing uses the time and frequency orthogonality to separate signals from different users. Sometimes, it is desirable to use a plurality of directional antennas or an antenna array to communicate with mobile stations. Use of directional antennas can reduce interference and increase coverage and the number of users. The use of antenna arrays requires some type of beamforming. The beamforming can be implemented in a variety of ways such as digital beamforming, analog beamforming, or by a beamforming matrix, such as a Butler matrix. Analog beamformers steer the beam by introducing a frequency-independent time delay, while digital beamforming usually involves a phase delay that is equivalent to the time delay at an operating frequency.

Several beamforming systems are illustrated in FIGS. 2 and 3. A digital beamforming system usually has a receiver for each element, which down-converts the frequency into I and Q (in-phase and Quadrature) channels for an A/D converter. Real-time beamforming takes place by multiplying these complex pairs of samples by appropriate weights in multiply/accumulate integrated circuits. The array output is formed using a complex signal from $n^{th}$ channel ($V_n$), a weighting coefficient ($W_n$), a steering phaseshift (e), and a correction factor ($C_n$). Corrections may be necessary for several reasons. These reasons include errors in the position of the element, temperature effects and the difference in behavior between those elements embedded in the array and those near the edge.

Thus, by shaping and directing the narrow antenna beams, a plurality of narrow beams can be used to simultaneously cover a large sector using the same antenna array. The present invention can use an adaptive algorithm for selecting the most feasible functions for the antenna.

The use of directional antennas is, however, sometimes complicated. For example, a base station must be able to transmit broadcast information to a mobile station with an arbitrary position in the cell. However, the cell cannot be made too narrow since this would cause excessive handovers and low trunking efficiency. Hence, there is a desire to have both highly directional antennas and wide lobe antennas in a single cell. One option would be to use multiple antennas in the cell. However, the use of several individual antennas with associated hardware is costly to install and organize. Another obvious solution to one of ordinary skill in the art would be to transmit the common or same information in all of the narrow antenna lobes used in the cell as illustrated in FIG. 4. The disadvantage with this solution is that information from different antenna lobes can sum up to zero, creating undesired nulls or near nulls in the combined antenna pattern 22. As illustrated in FIG. 4, the data to be broadcast is transmitted in all three directional lobes 20. The signals cancel in certain directions and thus deep nulls appear in the combined antenna pattern 22. For example, two lobes with equal amplitude will sum up to zero in a certain direction. As a result, a mobile station with all its scattering points in that direction may suffer from deep fade in signal power, as illustrated in FIG. 5. FIG. 5 illustrates that a mobile station 24 will suffer from very low received power since the mobile station 24 is located in a null in the combined antenna pattern 22. Meanwhile, signals received by a mobile station 26 will have an acceptable received power eventhough the mobile station is also located in a null in the combined antenna pattern 22. In this case, the signal is being reflected off of a building 28 so that the received signal strength is at an acceptable level.

Thus, there is a need for highly directional antennas in order to increase capacity and to improve coverage. There is also a need for antennas with low directivity so that information can be broadcast over the entire cell.

SUMMARY OF THE INVENTION

It is an object of one embodiment of the present invention to provide a method and apparatus for providing common communication signals throughout a cell using a base station with a array antenna.

According to one embodiment of the present invention, a method for broadcasting information in a cellular communication system comprising at least one base station with an antenna array and a plurality of mobile stations is disclosed. In this embodiment, the common information is preprocessed to create orthogonal signals. The orthogonal signals are then beam formed so that the orthogonal signals are delivered to the different elements in the array antenna. The orthogonal signals are transmitted and then received at at least one mobile station. The signals are then processed at the mobile station to decipher the common information from the orthogonal signals.

According to another embodiment of the present invention, a cellular communication system for broadcasting information is disclosed which contains at least one base station with an antenna array and a plurality of mobile stations. Each base station contains preprocessing means for preprocessing the common information to create orthogonal signals. Beamforming means then beamforms the orthogonal signals so that the orthogonal signals can be delivered to the elements of the array antenna. The orthogonal signals are then transmitted by a transmitting means. At at least one mobile station, receiving means receives the orthogonal signals and processing means process the signals to decipher the information from the orthogonal signal.

BRIEF DESCRIPTION OF THE DRAWINGS

These and other features and advantages of the invention will be readily apparent to one of ordinary skill in the art from the following written description, used in conjunction with the drawings, in which:

FIG. 4 illustrates nulls in an antenna pattern;

FIG. 5 illustrates a beamforming arrangement;

FIG. 6 illustrates a beamforming arrangement according to one embodiment of the present invention, for preprocessing with digital beamforming;

FIG. 7 illustrates a beam forming arrangement for beamforming at radio frequency according to one embodiment of the present invention;

DETAILED DESCRIPTION OF THE DISCLOSURE

Figure 1:
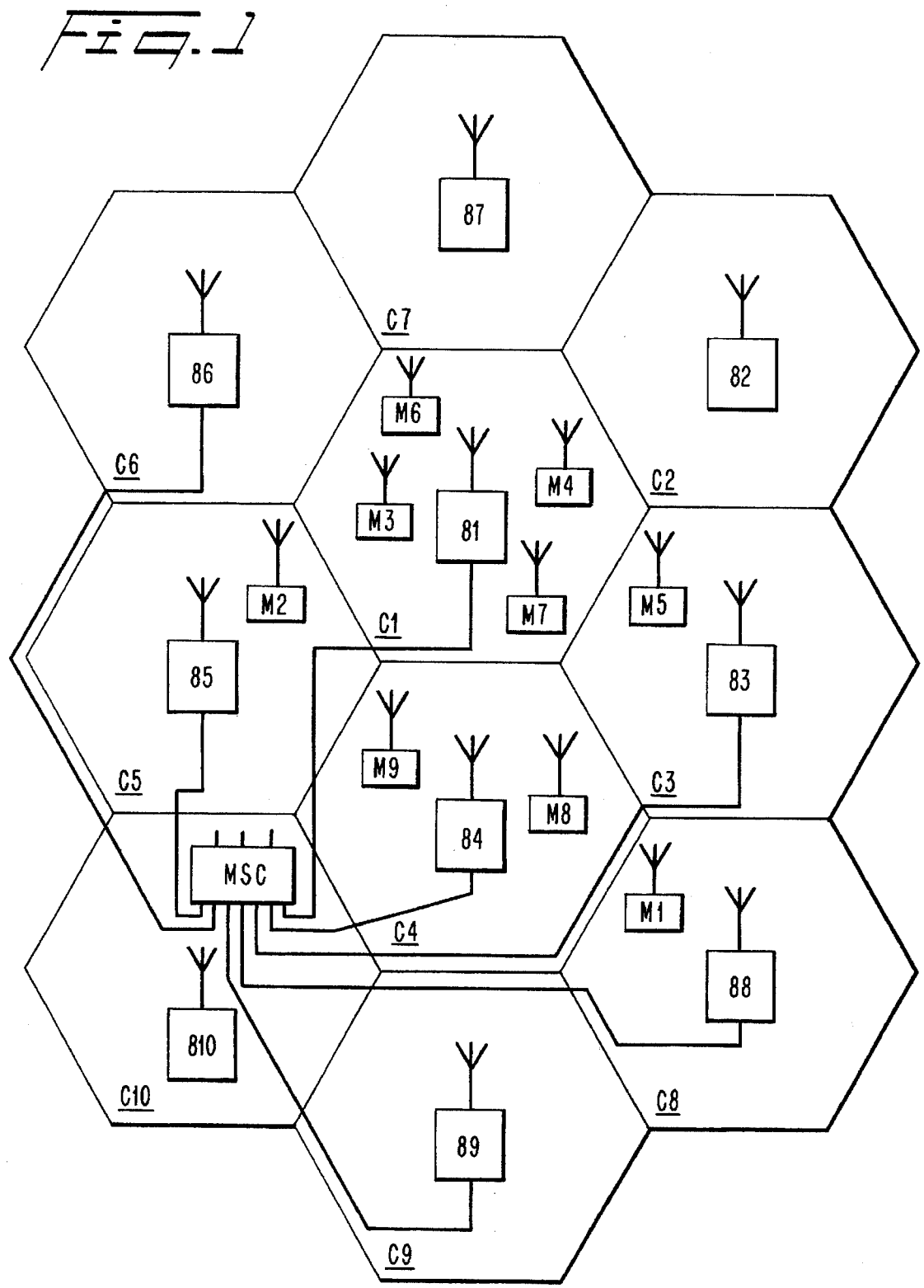
FIG. 1 illustrates basic layout of a cellular communication system.
Figure 2:
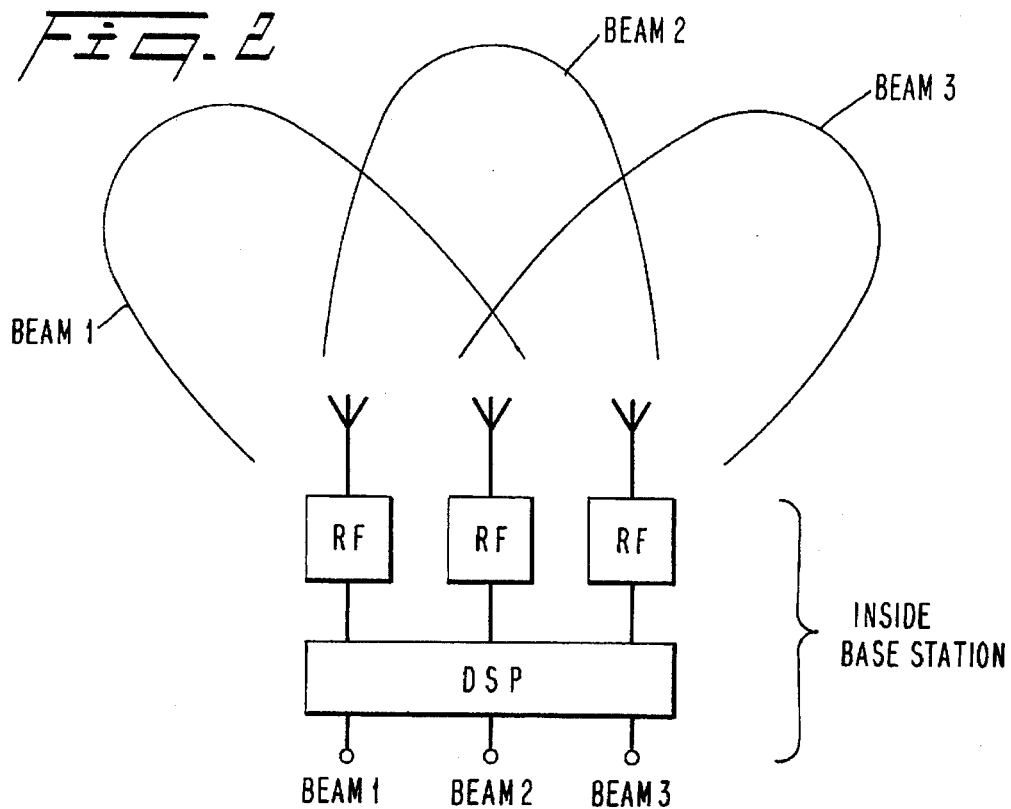
FIG. 2 illustrates an example of digital beam forming to create directional beams.
Figure 3:
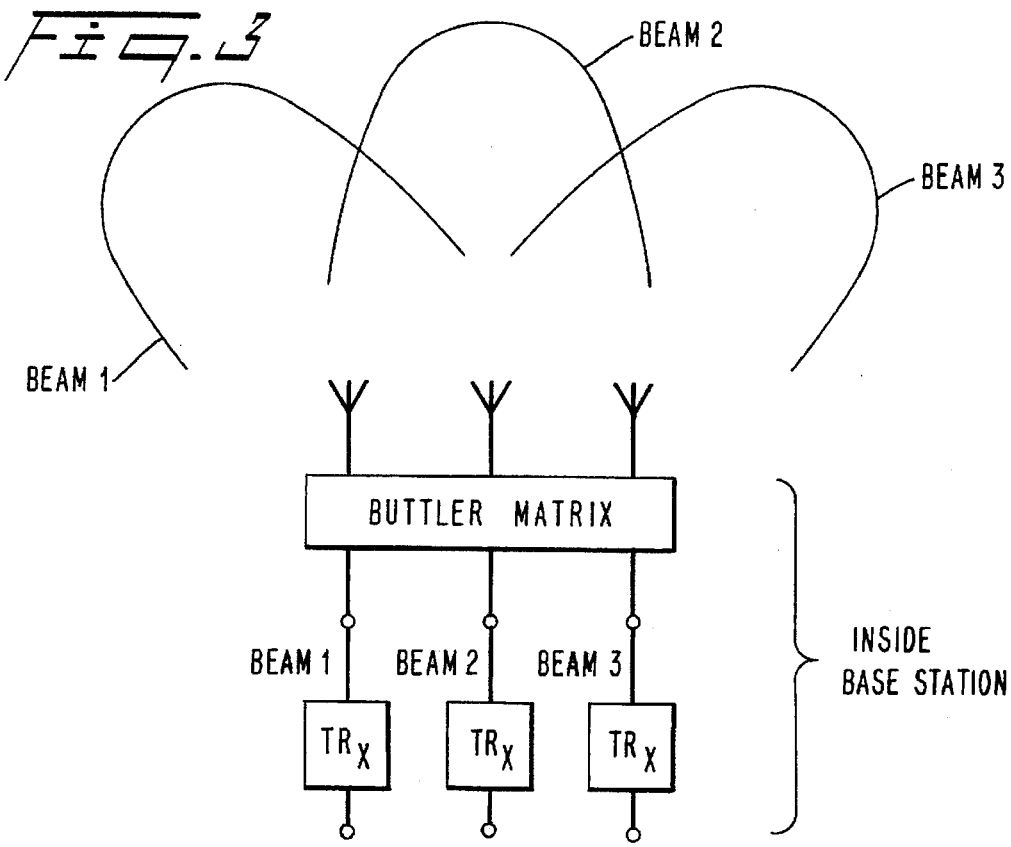
FIG. 3 illustrates beam forming at a radio frequency to create directional beams.

The present invention is primarily intended for use in base stations and cellular communication systems, although it would be understood by those skilled in the art that the present invention can also be used in other various communication applications.

According to one embodiment of the present invention, common information to be broadcast throughout the cell is divided into parallel data streams, one for each narrow lobe. This embodiment is illustrated in FIG. 6. The broadcast data d(k) is divided into a plurality of parallel paths, wherein the number of parallel paths equals the number of directional antennas used. It should be noted that the present embodiment divides the broadcast data into three parallel paths but is not limited thereto. Each path is then preprocessed using, for example, digital filters $H_1(Z)$, $H_2(Z)$, $H_3(Z)$. The filters are used to create sufficiently orthogonal signals. The signals from the digital filters 40 are then fed into a beamforming means 42 which creates the three directional antenna beams. The signals are transmitted with a narrow antenna lobe and the information is combined in the air. In this embodiment, the filters are chosen so that the signals cannot sum up to zero which ensures that the combined antenna pattern 46 does not contain nulls. In other words, signals from different narrow lobes arrive at different time instants. As a result, the mobile station cannot distinguish this situation from the situation where intersymbol interference due to multi-paths are received at the mobile station. Thus, the equalizer in the mobile station can be utilized to analyze the arriving information in the same manner an equalizer would be used to correct the received signal for intersymbol interference.

According to another embodiment of the present invention, analog filtering can also be used as illustrated in FIG. 7. In this embodiment, the broadcast data is modulated and upconverted to radio frequency and then divided into three parallel paths. The broadcast data is then preprocessed at the radio frequency by using, for instance, delay. As illustrated in FIG. 7, the signals can be delayed by the delay means 52 wherein, for example, delay 1 equals zero seconds, delay 2 equals $T_s$ seconds, and delay 3 equals zero seconds where $T_s$ is one symbol time. The delayed signals can then be entered into a Butler matrix 54 which forms the three individual antenna lobes in a known manner. The resulting combined antenna pattern 56 is also devoid of deep nulls since the delayed signals do not cancel each other out.

According to another embodiment of the present invention, orthogonalization can be implemented as modulating each of the paths with a slightly different carrier frequency. The frequency difference should be large enough to create fading but so slow that it does not create problems for the demodulator.

Figure 8:
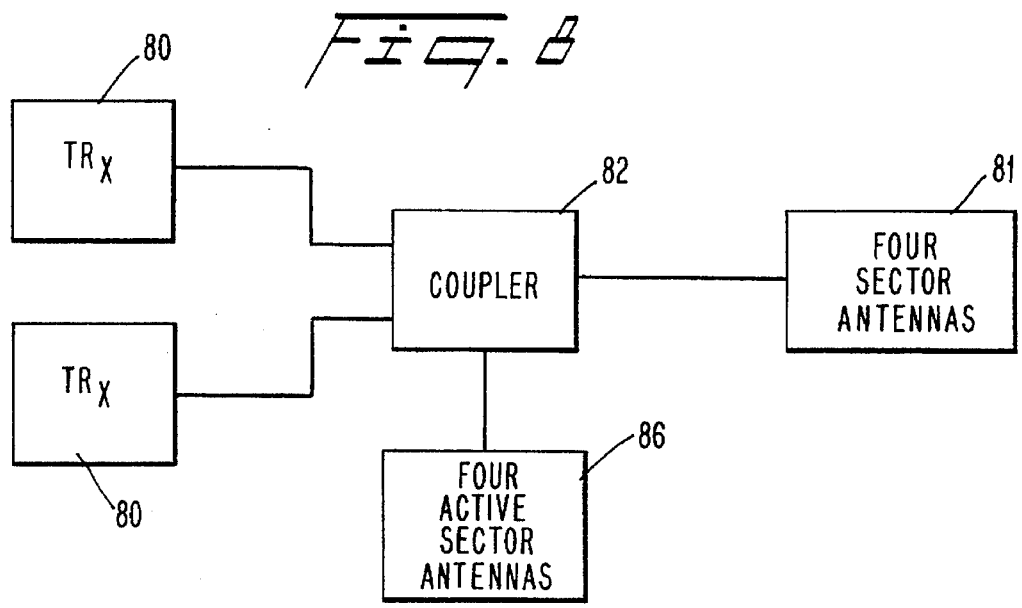
FIG. 8 illustrates an apparatus of a pseudo-omni site according to one embodiment of the present invention.

According to another embodiment of the present invention, pseudo-omni sites are described. The advantage with pseudo-omni sites is their large per site coverage area which results in low implementation costs in rural areas. In this embodiment of the present invention, multireceiver radio base stations are used to build the pseudo-omni sites, however the present invention is not limited thereto. FIG. 8 illustrates a hardware configuration of a pseudo-omni site according to one embodiment of the present invention. As illustrated in FIG. 8, at least one transceiver 80 is connected through a coupler 82 to a receive antenna arrangement 84 and a transmit antenna arrangement 86. According to one embodiment of the present invention, the receive antenna arrangement is comprised of four double polarized sector antennas which are mounted at equally spaced locations around a mast. The transmit antenna arrangement comprises four active sector antennas wherein each sector antenna is fed with the same low power input.

Figure 9:
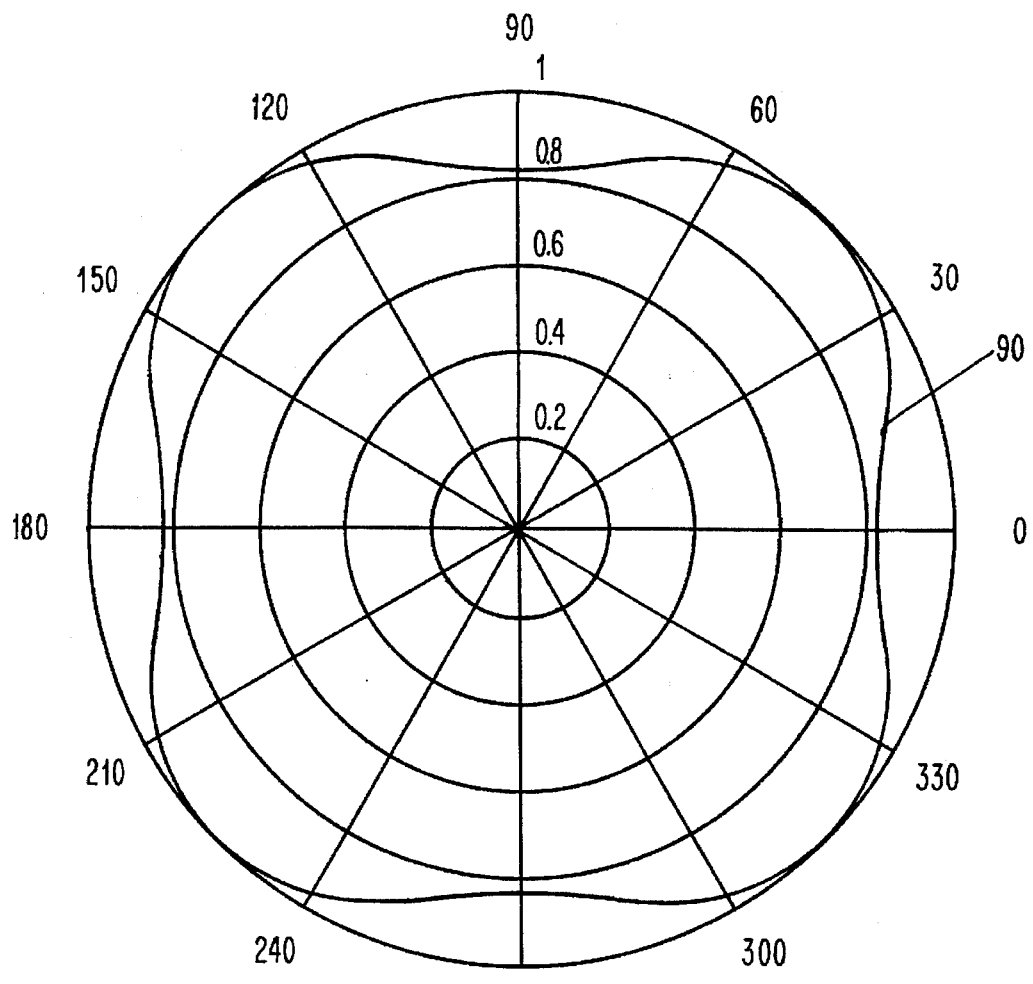
FIG. 9 illustrates the possible coverage shape of a pseudo-omni site according to one embodiment of the present invention.

The uplink carrier/noise performance of this system will now be described. The multireceiver equalizer can use diversity combining to sort out and combine the proper received signal from all four sector antennas. An additional diversity gain is possible for the existing space diversity arrangements for mobile stations received in more than one sector antenna, i.e., in more than two diversity branches. This diversity gain is typically dependent upon the quotient between the spacing between the sector antennas and the cell range. According to one embodiment of the present invention, the sector antennas are mounted on a relatively thin mast so that the spacing is small, typically one to two meters, and the cells are relatively large, typically ten to 20 kilometers. The antenna gain in the pseudo-omni sites could be 19–20 decibels relative to an isotrope antenna, which is a considerable increase over existing omni antennas which have a gain of 11–12 decibels relative to the isotrope antenna. An example of the possible coverage shape of the pseudo-omni site is illustrated in FIG. 9 and assumes a path loss of $\tau^{2.5}$ and $\cos^4(\alpha)$ sector antenna. In this embodiment, the sector antennas are directed in the ±45, ±135 degrees direction, but the present invention is not limited thereto. The assumed sector antenna gives a six decibel loss in antenna gain 45 degrees from broadside. However, this is partly compensated for by a three decibel noise diversity gain in the equalizer at these points thus resulting in a total of a three decibel loss in C/N performance. Finally, the loss of three decibels in performance is mapped to a reduction in coverage using the path loss assumption which is illustrated by the line 90 in FIG. 9. An assumption of additional diversity between sectors would make the coverage area more circular in shape.

Figure 10:
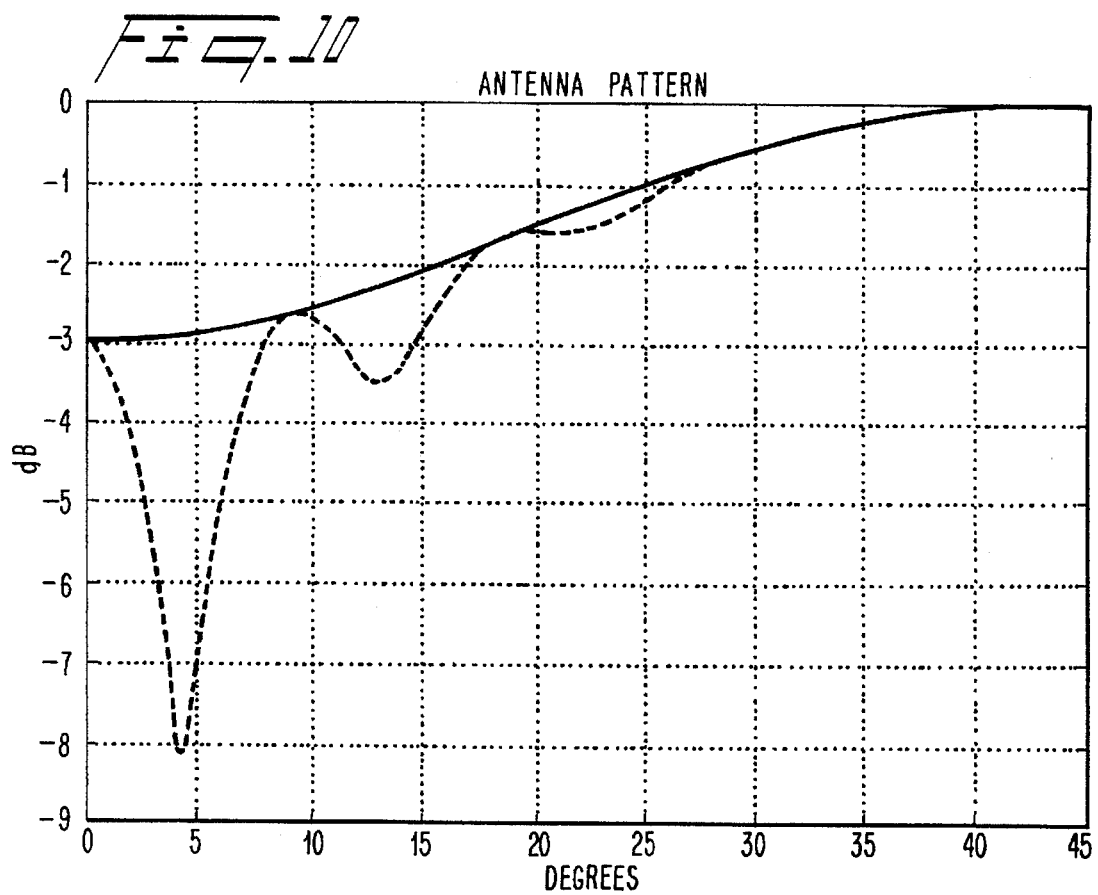
FIG. 10 illustrates an antenna pattern from a pseudo-omni site according to one embodiment of the present invention.
Figure 11:
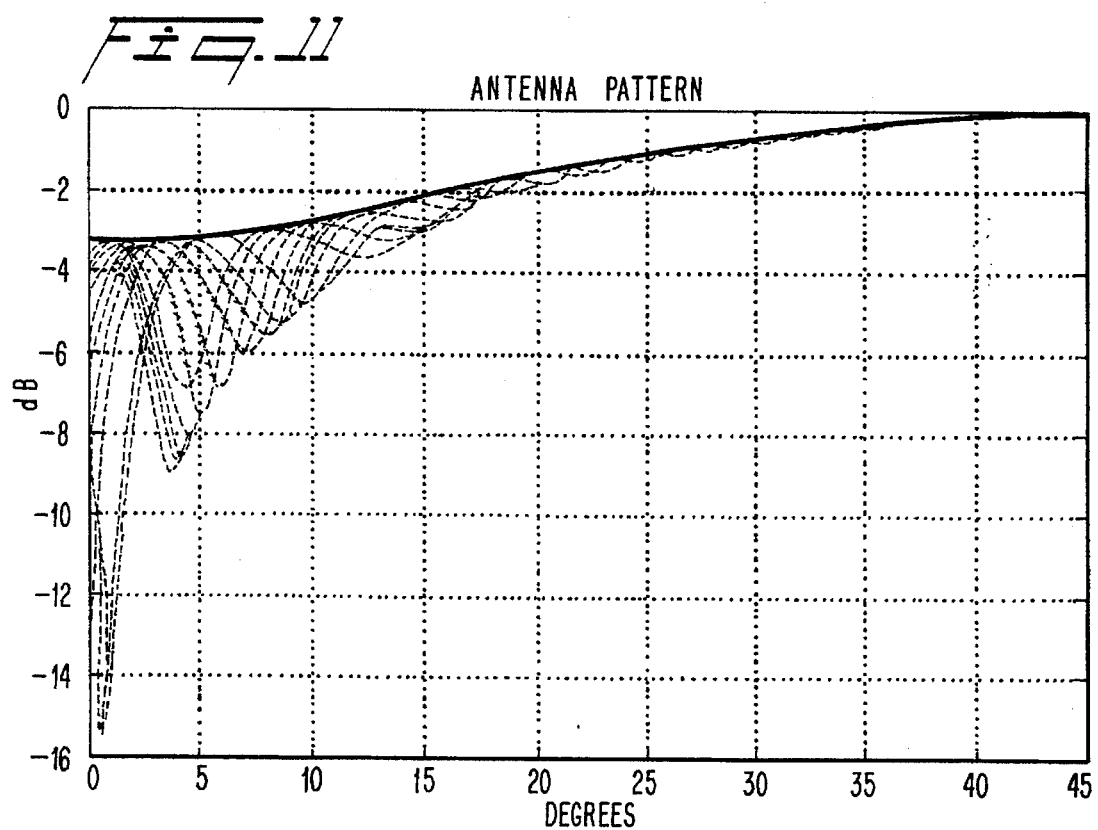
FIG. 11 illustrates 20 antenna patterns from a pseudo-omni site according to one embodiment of the present invention.

The downlink carrier/noise performance will now be described. According to one embodiment of the present invention, four transmit antennas are used to distribute the downlink in a pseudo-omni pattern with the goal to cover the area shown in FIG. 9. The straightforward manner to feed the sector antennas will cause deep nulls in the antenna diagram, as illustrated by the dashed line in FIG. 10, which shows an example of the nulls calculated with $\cos^4(\alpha)$ sector antennas, 1900 MHz and one meter antenna separation. The two sector antennas will interfere in the middle between their pointing directions. Furthermore, the null problem cannot be solved by merely introducing a relative time varying phase error between the antennas or by not feeding the antennas coherently, as illustrated in FIG. 11. In FIG. 11, 20 antenna patterns from a pseudo-omni site generated with four sector antennas around mast are illustrated which shows that the nulls, while moved, are still present.

The nulls in the total antenna pattern can be avoided using any of the previously mentioned means of frequency or time orthogonalization. According to one embodiment of the present invention, the problem with nulls in the combined signals is overcome by using transmit antennas with different polarizations to create orthogonal signals. By using orthogonal polarization so that the E-field from the antennas pointing in 45° and −135° directions are orthogonal to the E-field from the antennas pointing in the −45° and 135° directions, the nulls are removed from the total E-field antenna pattern, i.e., $|E_v + E_h|^2 > 0$. The performance of the present invention depends upon the environment. For example, assume that the cross polarization discrimination is close to one and symmetric in the sense that the vertical and horizontal polarizations have approximately the same properties. It then follows that the broadside performance is unchanged, i.e., approaching the solid line in FIG. 10. The mobiles in the middle between the sector antennas will see two antennas with independent fading due to the orthogonal polarization and the signals from the antennas will sum up to a new Rayleigh fading channel. Thus, the performance in the middle between the antennas will also approach the solid line illustrated in FIG. 10.

It will be appreciated by those of ordinary skill in the art that the present invention can be embodied in other specific forms without departing from the spirit or central character thereof. The presently disclosed embodiments are therefore considered in all respects to be illustrative and not restrictive. The scope of the invention is indicated by the appended claims rather than the foregoing description, and all changes which come within the meaning and range of equivalence thereof are intended to be embraced therein.

We claim:

1. A method for broadcasting information in a cellular communication system comprising at least one base station with an array antenna and a plurality of mobile stations, comprising the steps of:

preprocessing the information using a frequency shift to generate orthogonal signals;

beamforming said orthogonal signals so that said orthogonal signals are delivered to the elements of the array antenna;

transmitting said orthogonal signals;

receiving said orthogonal signals at at least one of said mobile stations; and processing said signals to decipher said information from said orthogonal signals.

2. A method for broadcasting information according to claim 1, wherein said information is individually preprocessed for each beam so that deep nulls in a combined antenna pattern are avoided.

3. A cellular communication system for broadcasting information comprising at least one base station with an array antenna and a plurality of mobile stations, comprising:

means for preprocessing the information using a frequency shift to generate orthogonal signals;

beamforming means for beamforming said orthogonal signals;

transmitting means for transmitting said orthogonal signals on an array antenna;

receiving means at a mobile station for receiving said orthogonal signals; and processing means for processing said signals to decipher said information from said orthogonal signals.

4. A cellular communication system according to claim 3, wherein said information is individually preprocessed for each base station so that deep nulls in a combined antenna pattern are avoided.

5. A cellular communications system for broadcasting information comprising at least one base station and a plurality of mobile stations, comprising:

means for duplicating and processing information into a plurality of identical parallel signals;

means for orthogonalizing said identical parallel signals by modulating the parallel signals with slightly different carrier frequencies;

transmitting means for transmitting each signal using a directional antenna;

receiving means at said mobile stations for receiving signals from said directional antennas; and means for combining energy from each of the received signals to restore the information.

6. A cellular communication system according to claim 5, wherein said number of identical parallel signals equals the number of said directional antennas.

7. A pseudo-omni site for use in a cellular communication system for transmitting signals to and receiving signals from a plurality of mobile stations, comprising:

a plurality of transceiver means for processing information;

a receive antenna arrangement for receiving signals;

a transmit antenna arrangement for transmitting signals in a pseudo-omni antenna pattern;

a coupling means for connecting said plurality of transceivers to said receive and transmit antenna arrangements;

means for diversity combining signals received from said receive antenna arrangement;

digital filters for orthogonalizing signals to be transmitted to said mobile stations so as to prevent nulls from occurring in the antenna pattern.

8. A pseudo-omni site according to claim 7, wherein said digital filters are selected so that the transmitted signals do not sum up to zero when combined.

9. A pseudo-omni site for use in a cellular communication system for transmitting signals to and receiving signals from a plurality of mobile stations, comprising:

a plurality of transceiver means for processing information;

a receive antenna arrangement for receiving signals;

a transmit antenna arrangement for transmitting signals in a pseudo-omni antenna pattern;

a coupling means for connecting said plurality of transceivers to said receive and transmit antenna arrangements;

means for diversity combining signals received from said receive antenna arrangement;

means for orthogonalizing signals to be transmitted to said mobile stations so as to prevent nulls from occurring in the antenna pattern, wherein said signals to be transmitted are orthogonalized by modulating the parallel signals with slightly different carrier frequencies.

10. A pseudo-omni site for use in a cellular communication system for transmitting signals to and receiving signals from a plurality of mobile stations, comprising:

a plurality of transceiver means for processing information;

a receive antenna arrangement for receiving signals which is comprised of four double polarized sector antennas which are mounted around a mast;

a transmit antenna arrangement for transmitting signals in a pseudo-omni antenna pattern;

a coupling means for connecting said plurality of transceivers to said receive and transmit antenna arrangements;

means for diversity combining signals received from said receive antenna arrangement;

means for orthogonalizing signals to be transmitted to said mobile stations so as to prevent nulls from occurring in the antenna pattern.

11. A pseudo-omni site according to claim 10, wherein said double polarized antennas are equally spaced around the mast.

12. A pseudo-omni site for use in a cellular communication system for transmitting signals to and receiving signals from a plurality of mobile stations, comprising:

a plurality of transceiver means for processing information;

a receive antenna arrangement for receiving signals;

a transmit antenna arrangement for transmitting signals in a pseudo-omni antenna pattern, said transmit antenna arrangement comprising four active sector antennas;

a coupling means for connecting said plurality of transceivers to said receive and transmit antenna arrangements;

means for diversity combining signals received from said receive antenna arrangement;

means for orthogonalizing signals to be transmitted to said mobile stations so as to prevent nulls from occurring in the antenna pattern.

13. A pseudo-omni site for use in a cellular communication system for transmitting signals to and receiving signals from a plurality of mobile stations, comprising:

a plurality of transceiver means for processing information;

a receive antenna arrangement for receiving signals;

a transmit antenna arrangement for transmitting signals in a pseudo-omni antenna pattern;

a coupling means for connecting said plurality of transceivers to said receive and transmit antenna arrangements;

means for diversity combining signals received from said receive antenna arrangement;

means for orthogonalizing signals to be transmitted to said mobile stations so as to prevent nulls from occurring in the antenna pattern, wherein said orthogonalizing means uses analog filtering at a radio frequency or any intermediate frequency.

* * * * *